June 4, 1935.  A. ANDREAS  2,003,417
FEEDING MECHANISM FOR FILLING MACHINES
Filed Nov. 18, 1931   3 Sheets-Sheet 2
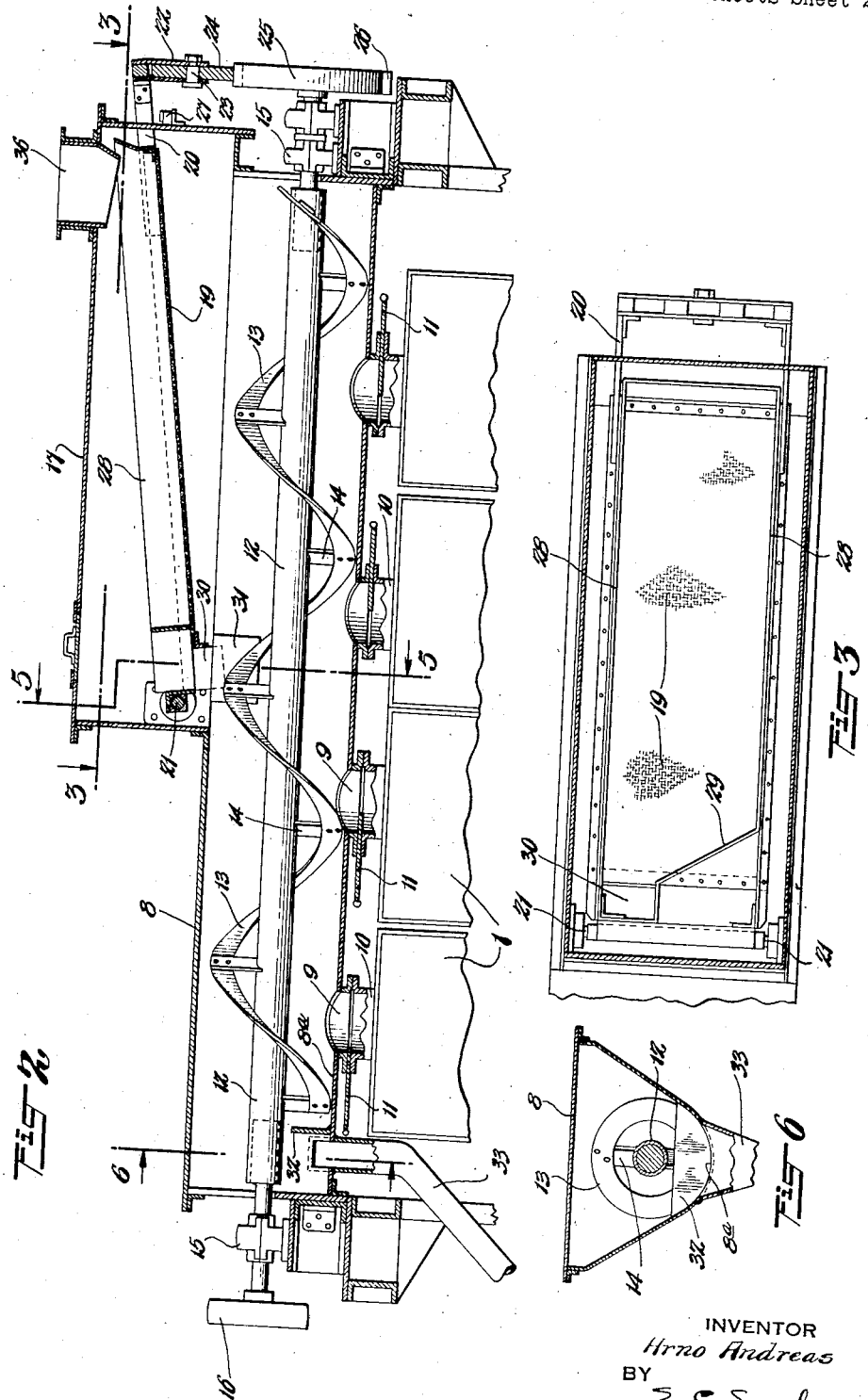

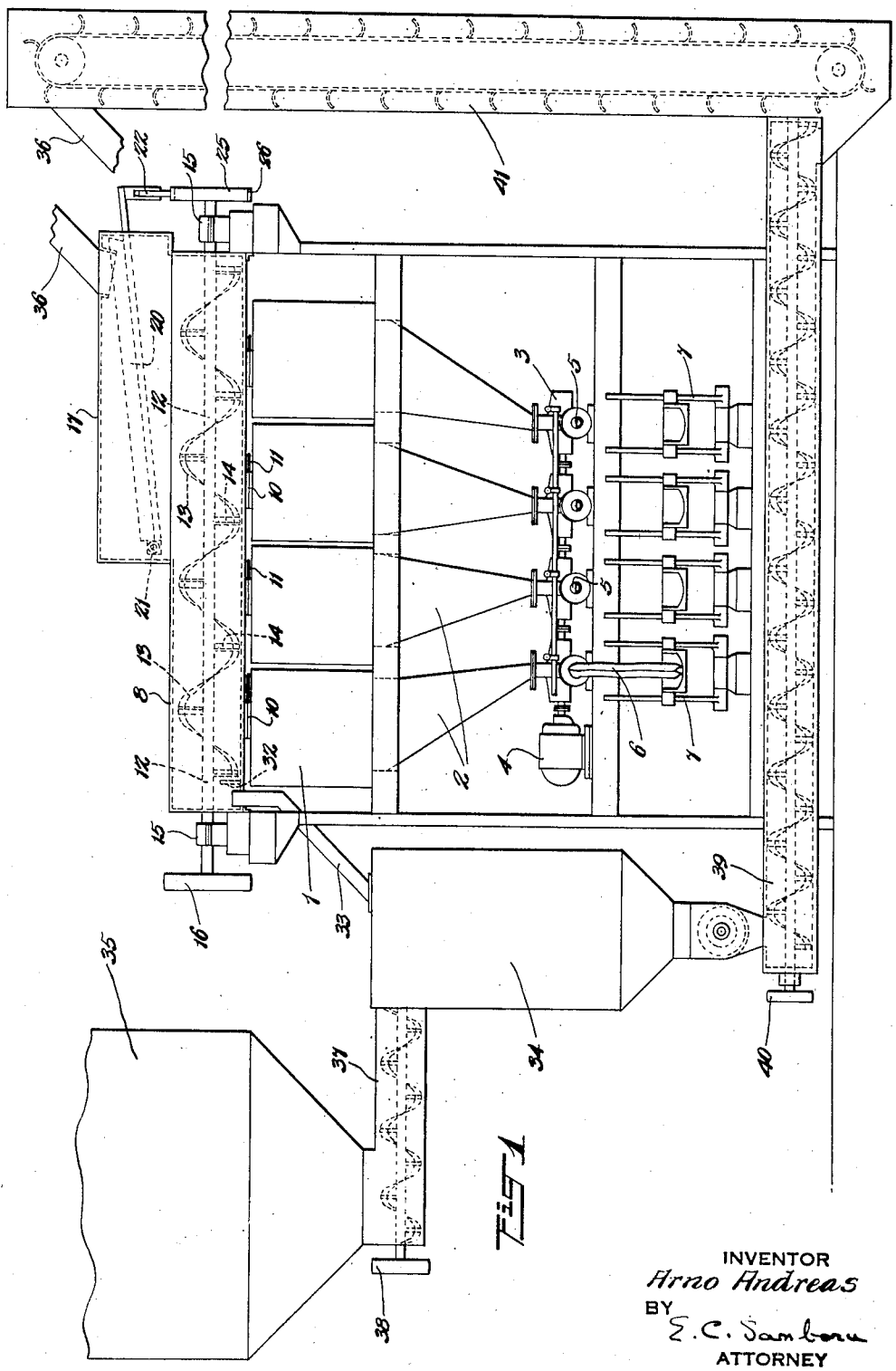

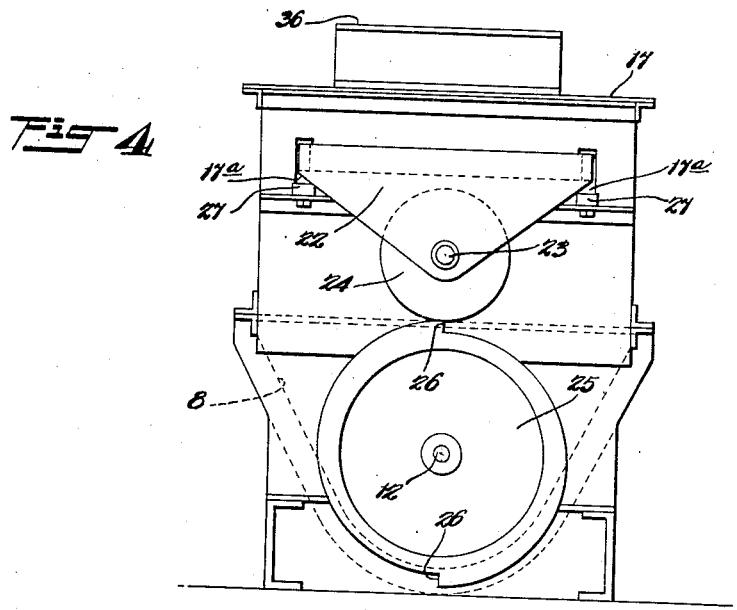

Patented June 4, 1935

2,003,417

UNITED STATES PATENT OFFICE 2,003,417

FEEDING MECHANISM FOR FILLING MACHINES

Arno Andreas, Munster, Germany

Application November 18, 1931, Serial No. 575,700

11 Claims. (Cl. 226—48)

In bag filling machines such as are used for packing cement, it has been customary to weigh the bags while filling them with material and simultaneously jigging them, which results in substantial inaccuracies in weights. If the material be weighed first and then placed in the bags to relieve the weighing mechanism of the jogging, the weights of the bags can be made more nearly uniform, and I have shown, in my copending application Ser. No. 419,986, filed January 10, 1930, a practical embodiment of this principle in a cement packer. The present invention relates to machines of this character and has for its principal object the provision of means for insuring even greater accuracy and uniformity in the weights of the filled bags or other containers.

I have found that even though full and dribble feed valves are used to control the flow of material to the weighing receptacle, the accuracy of weight obtainable depends to some extent upon the depth of material in the feeder above the valves. Of course, the object of using full and dribble feed valves is to cut off the feed when exactly the desired amount of material has passed the valves, and it has generally been considered that such construction was satisfactory. However, I have found that errors in weighing can be still further reduced by the present improved construction for feeding material.

While the invention is described in connection with a machine in which the material is weighed prior to being placed in bags or other containers, it will be understood that it possesses similar advantages where the material is weighed in the bags, as well as where cut-off valves other than the full and dribble feed type are used.

A preferred embodiment of the invention will now be described in connection with the accompanying drawings wherein:

Fig. 1 is a front elevation partly in section and mainly diagrammatic, showing a construction in accordance with the present invention. Fig. 2 is a front elevation, partly in section, on enlarged scale, of the upper part of the construction shown in Fig. 1. Fig. 3 is a section taken on the line 3—3 of Fig. 2. Fig. 4 is an end elevation of the construction shown in Fig. 2. Fig. 5 and Fig. 6 are sections taken on the lines 5—5 and 6—6 respectively of Fig. 2. Fig. 7 shows a modification of the construction illustrated in Fig. 2, and Fig. 8 is a section on the line 8—8 of Fig. 7.

There are shown diagrammatically at 1 weighing devices of known construction including valves which automatically cut off the feed to the weighing receptacles when full weight is reached. The weighed material is then discharged into hoppers 2, from where it is positively fed by propellers 3 through spouts 5 into bags 6, carried on jigging devices 7, which are adapted to tilt to discharge the bags when full. The propellers are suitably driven by an electric motor 4. All this construction is disclosed in my copending application referred to.

Above the weighing mechanism there is provided a screw conveyor preferably substantially horizontal, mounted in housing or bin 8, in the bottom or floor of which are formed openings 9, located above tubes 10 for leading material to the several weighing devices. In these tubes there are slide valves 11 of any suitable construction for adjusting the size of the openings, so that when the material is fed from right to left, as shown, the opening furtherest from the supply of material is the largest. The screw conveyor consists of a shaft 12 having a screw 13 carried thereon by radial arms 14. This shaft is mounted in bearings 15 outside either end of the housing and is driven from a suitable source of power by a pulley 16.

It is desirable that the conveyor for advancing the material come as near the bottom of the bin as possible so as to break up any material which tends to cake as does cement. This caking action may even result, where the air is excessively damp, in bridging over openings in the tubes which lead to the weighing devices. As a practical matter, though, it is not possible on account of sagging, to arrange a relatively long conveyor, whose shaft is supported only at its ends, so that it is capable of removing these bridges in a number of openings. Hence, in Figs. 7 and 8 there is shown a construction for this purpose, consisting of adjustable blades 45 secured to the screw 13 by bolts 46. These blades are located only adjacent the openings and are preferably arranged to extend somewhat into the openings, on each revolution of the conveyor.

Above conveyor, at one end thereof is a screening device for separating lumps or heterogeneous pieces of material. This device consists of a housing 17 opening at the bottom into the housing 8, and a screen 19 carried on frame 20, pivoted at one end on the housing as at 21. The other end of the frame extends through the slots 17—a in the housing and is supported by triangular plates 22 which extend downwardly for carrying therebetween on shaft 23, a roller 24. This roller is supported on a cam 25, mounted on shaft 12, and notched at 26, for gradually raising one end of this screen frame and then dropping it a certain distance. Resilient stops 27 may be provided for the frame 20 in order to take the force off the cam. Around this screen and carried with the frame 20 are side-walls 28 which are funnel-shaped at one end as at 29. For carrying off the material which does not pass through the screen there is a tube 30 at the end of the screen adjoining the funnel walls, and discharging into conduit 31 for returning the material to any suitable point.

As indicated above, it is highly desirable that the material be fed uniformly to the weighing devices, and in order to secure this result I have provided at the end of the screw conveyor opposite that at which the material enters, a dam 32, which extends completely across the conveyor as shown in Fig. 6. Beyond this dam is an outlet pipe 33 which preferably extends above the floor 8—a of the conveyor housing 8. It will be appreciated that in certain cases the upwardly extending pipe 33 may take the place and serve the functions of dam 32.

The pipe returns the material which passes over the dam to any suitable point in the feeder such as hopper 34. In the manufacture of many materials such as cement, it is customary to dump large batches of material into the packaging machines, or at least into hoppers which feed directly to the packaging machines. I have found that this sudden influx of such material may cause variations in the weights of material in the bags and in order to avoid this, I have provided an auxiliary hopper 34 between the hopper 35, into which the cement from the factory is discharged, and the inlet pipe 36 which leads to the screen device; and between the two hoppers, as well as between the hopper 34 and the screening device, I have provided conveyors for regulating or evening out the flow of material. That is, between hopper 35 and hopper 34 there is a horizontal screw conveyor 37 driven through a suitable pulley 38, and leading from the bottom of the hopper 35 into the top of the hopper 34. From the bottom of the hopper 34 another horizontal screw conveyor, driven through pulley 40, moves the material to the bottom of a bucket elevator 41, this elevator serving to raise the material and discharge it through tube 36 into the screening device, from where it is fed by the screw conveyor 13 to the various weighing mechanisms.

I have found that by feeding the material in a stream to the bottom of an elevator of the type described, the uniformity of the feed to the weighing devices is substantially bettered, and that the desired result is secured to an even greater extent by the provision of the auxiliary hopper 34 and the horizontal feeder to the top thereof. The advantages of accurate weighing secured by my present construction are of great importance, because machines of the character disclosed generally operate to fill some 800 bags of cement in an hour, and to be on the safe side the bags must be filled with more than the average amount required. Hence the saving of even a pound or so in the weight of each bag amounts to a considerable figure.

The terms and expressions which I have employed are used as terms of description and not of limitation and I have no intention, in the use of such terms and expressions, of excluding any equivalents of the features shown and described or portions thereof, but recognize that various modifications are possible within the scope of the invention claimed.

I claim:

1. In a bag filling machine including weighing mechanism and means to convey weighed material to a bag, a substantially horizontal bin for material, said bin having an opening in its under side adapted to discharge material into the weighing mechanism, means to supply material to the bin at one side of the opening, means to convey it along the bin, a dam on the other side of the opening for regulating the depth of material in the bin, and an overflow beyond the dam.

2. In a bag filling machine including weighing mechanism and means to convey weighed material to a bag, a substantially horizontal bin for material, said bin having an opening in its underside adapted to discharge material into the weighing mechanism, means including a hopper for furnishing a regular supply of material to the bin at one side of the opening, means to convey it along the bin, a dam on the other side of the opening for regulating the depth of material in the bin, and an overflow beyond the dam.

3. In a bag filling machine including weighing mechanism having an automatic valve for cutting off the feed of material to be weighed, a bin having an opening in its under side adapted to discharge material to be weighed into the weighing mechanism, means to supply material to the bin at one side of the opening, means to convey it along the bin to the opening, a dam on the other side of the opening for regulating the depth of material in the bin, and an overflow beyond the dam.

4. In a bag filling machine including weighing mechanism and means to convey weighed material to a bag, a substantially horizontal bin for material, said bin having an opening in its under side adapted to discharge material into the weighing mechanism, means to supply material to the bin at one side of the opening, means to convey it along the bin, a dam on the other side of the opening for regulating the depth of material in the bin, an overflow beyond the dam, and means to elevate material to the bin from a supply point therebelow.

5. The combination claimed in claim 4 wherein the elevating means comprises a bucket elevator.

6. In a bag filling machine, weighing and bag filling means, means above said weighing means for delivering material thereto, a hopper for receiving and discharging material from a source of supply, means for transporting to said delivering means material discharged by said hopper and an auxiliary hopper interposed between the first mentioned hopper and said transporting means for providing uniformity of flow of material to said transporting means despite variations in flow from the first mentioned hopper.

7. The combination as claimed in claim 6 wherein positive feeding means is provided between the bottom portion of the first mentioned hopper and the top portion of the auxiliary hopper.

8. In a machine of the character described, means for filling bags with finely divided material such as cement and means for conveying the material to the filling means including a bin, an opening in the bottom of the bin leading to the filling mechanism, means to advance the material along the bin to the opening, and means carried with the last-named means for breaking up bridges of material in the opening.

9. The method of supplying material to a weighing mechanism in a bag filling machine which comprises feeding material vertically to one side of an opening in a bin, conveying the material in a substantially horizontal direction to said opening, and obstructing the horizontal flow of said material while enabling overflow of excess material, thereby assuring uniformity of feed to the weighing mechanism.

10. Means for controlling the supplying of material to a weighing mechanism of a bag filling machine, said means comprising a bin for receiving material, said bin having an opening in its underside for discharging material into the weighing mechanism, means for supplying material to the bin at one side of the opening, means to convey said material along the bin, and a dam on the other side of the opening for regulating the depth of material in the bin.

11. In a bag filling machine including weighing means, a hopper for receiving material, an auxiliary hopper, means for feeding material to the weighing mechanism and located thereabove, means for conveying the material from the bottom of the hopper to the top of the auxiliary hopper, means for elevating material from the bottom of the auxiliary hopper to the feeding means, the said feeding means comprising a substantially horizontal floor having an opening therein adapted to discharge the material into the weighing mechanism, means to supply material to the floor at one side of the opening, means to convey it along the floor, a dam on the other side of the opening for regulating the depth of material on the floor, and an overflow beyond the dam.

ARNO ANDREAS.